US010735580B2

(12) United States Patent
Gallo (10) Patent No.: US 10,735,580 B2
(45) Date of Patent: Aug. 4, 2020

(54) MOBILE DEVICE USER VALIDATION METHOD AND SYSTEM

(71) Applicant: MASTERCARD INTERNATIONAL INCORPORATED, Purchase, NY (US)

(72) Inventor: Francesco Gallo, Styria (AT)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 168 days.

(21) Appl. No.: 15/848,723

(22) Filed: Dec. 20, 2017

(65) Prior Publication Data

US 2018/0183925 A1 Jun. 28, 2018

(30) Foreign Application Priority Data

Dec. 22, 2016 (EP) .................................... 16206216

(51) Int. Cl.
*H04M 3/38* (2006.01)
*H04W 12/06* (2009.01)
*H04L 29/06* (2006.01)
*H04L 9/32* (2006.01)

(52) U.S. Cl.
CPC .......... *H04M 3/382* (2013.01); *H04L 9/3213* (2013.01); *H04L 9/3226* (2013.01); *H04L 63/08* (2013.01); *H04L 63/0861* (2013.01); *H04W 12/06* (2013.01)

(58) Field of Classification Search
CPC .... H04M 3/382; H04L 9/3213; H04L 9/3226; H04L 63/08; H04L 63/0861; H04W 12/06

USPC ........................................................... 726/19
See application file for complete search history.

(56) References Cited

U.S. PATENT DOCUMENTS

| 6,338,140 | B1 * | 1/2002 | Owens ................. H04W 12/06 380/255 |
| 6,757,290 | B1 * | 6/2004 | Kalmanek, Jr. ... H04L 29/12377 370/401 |
| 7,340,525 | B1 * | 3/2008 | Bhatia ................. H04L 63/0815 709/229 |

(Continued)

OTHER PUBLICATIONS

European Search Report issued in European Application No. 16206216.0 dated May 17, 2017, 7 pages.

*Primary Examiner* — Shahriar Zarrineh
(74) *Attorney, Agent, or Firm* — Armstrong Teasdale LLP (57) ABSTRACT

A system including a mobile device, a user of the mobile device, a computer system having a telecommunication module for telephonically communicating with the mobile device, a user of the computer system, and a security server is provided. Also provided is a method, at a mobile device, of authenticating a user of the mobile device during a telephone call having the steps of obtaining a user authentication input, obtaining validation of the user authentication input, initiating a telephone call with, or receiving a telephone call from, the computer system, and if the user authentication input is successfully validated, sending a token generated for the telephone call with the computer system via data-over-voice frequency signaling during the telephone call thereby providing an indication that the user authentication input has been successfully validated to the computer system.

11 Claims, 9 Drawing Sheets

(56) References Cited

U.S. PATENT DOCUMENTS

| | | | | |
|---|---|---|---|---|
| 7,366,913 B1* | 4/2008 | Haley | | G06Q 20/32 235/380 |
| 7,698,566 B1* | 4/2010 | Stone | | H04L 63/08 713/186 |
| 8,799,655 B1* | 8/2014 | Dotan | | H04L 9/3228 380/270 |
| 9,344,892 B1* | 5/2016 | Rodrigues | | H04M 15/56 |
| 9,779,405 B1* | 10/2017 | Krausz | | G06Q 20/405 |
| 9,801,216 B1* | 10/2017 | Williams | | H04W 84/12 |
| 10,091,355 B2* | 10/2018 | Flores | | H04M 3/4936 |
| 2002/0029350 A1* | 3/2002 | Cooper | | G06Q 10/10 726/26 |
| 2004/0250085 A1* | 12/2004 | Tattan | | G06F 21/32 713/186 |
| 2005/0166263 A1* | 7/2005 | Nanopoulos | | G06F 21/31 726/7 |
| 2005/0273442 A1* | 12/2005 | Bennett | | G06Q 20/3674 705/67 |
| 2006/0147000 A1* | 7/2006 | Novi | | H04M 1/505 379/88.19 |
| 2006/0221941 A1* | 10/2006 | Kishinsky | | H04M 3/523 370/352 |
| 2007/0083918 A1* | 4/2007 | Pearce | | H04L 63/0428 726/5 |
| 2007/0116236 A1* | 5/2007 | Kargman | | H04M 3/4938 379/221.11 |
| 2007/0143831 A1* | 6/2007 | Pearson | | H04L 63/08 726/5 |
| 2008/0120711 A1* | 5/2008 | Dispensa | | H04L 63/0869 726/7 |
| 2009/0122984 A1* | 5/2009 | Fascenda | | H04K 1/00 380/247 |
| 2009/0217048 A1* | 8/2009 | Smith | | H04L 63/06 713/176 |
| 2009/0228966 A1* | 9/2009 | Parfene | | G06F 21/31 726/7 |
| 2009/0328167 A1* | 12/2009 | O'Mahony | | H04L 63/08 726/6 |
| 2010/0020946 A1 | 1/2010 | Jackson et al. | | |
| 2011/0143714 A1* | 6/2011 | Keast | | H04W 12/06 455/411 |
| 2011/0143715 A1 | 6/2011 | Labrador et al. | | |
| 2011/0263224 A1* | 10/2011 | Kramarenko | | H04M 3/38 455/411 |
| 2011/0280151 A1* | 11/2011 | Medynski | | H04M 3/4234 370/254 |
| 2012/0079570 A1* | 3/2012 | Fu | | H04L 9/3213 726/5 |
| 2014/0201532 A1* | 7/2014 | Toy | | H04W 12/04 713/171 |
| 2015/0058950 A1* | 2/2015 | Miu | | H04L 63/105 726/7 |
| 2015/0105046 A1* | 4/2015 | Grosby | | H04W 12/06 455/411 |
| 2015/0186657 A1* | 7/2015 | Nakhjiri | | H04L 63/06 713/155 |
| 2015/0310201 A1* | 10/2015 | Sugiyama | | H04W 12/12 726/7 |
| 2015/0382263 A1* | 12/2015 | Jain | | H04W 76/10 455/432.1 |
| 2016/0007195 A1 | 1/2016 | Goldstone et al. | | |
| 2016/0127902 A1 | 5/2016 | Ciarniello et al. | | |
| 2016/0255067 A1* | 9/2016 | Keromytis | | H04L 63/0807 726/7 |
| 2016/0371475 A1* | 12/2016 | Zhao | | G06F 21/31 |
| 2017/0019402 A1* | 1/2017 | Kulkarni | | H04L 63/0807 |
| 2017/0034183 A1* | 2/2017 | Enqvist | | H04L 63/08 |
| 2017/0187701 A1* | 6/2017 | Bonnell | | G06Q 10/063 |
| 2017/0364920 A1* | 12/2017 | Anand | | H04L 63/0861 |
| 2018/0139206 A1* | 5/2018 | Ezell | | H04L 63/0876 |

* cited by examiner

MOBILE DEVICE USER VALIDATION METHOD AND SYSTEM

CROSS REFERENCE TO RELATED APPLICATIONS

This application claims the benefit of European Patent Application No. 16206216.0 filed Dec. 22, 2016, which is hereby incorporated by reference in its entirety.

BACKGROUND

The present disclosure relates generally, but not exclusively, to methods and systems capable of validating the identity of the user of a mobile telephone.

When a consumer conducts a telephone call with a consumer services representative, such as an issuing bank consumer services representative, it is often a requirement that the identity of the consumer be validated.

Conventionally, this involves the consumer services representative asking a series of security questions in order to verify the identity of the consumer. This process can be lengthy and inefficient. In addition, the consumer may not be able to answer all the questions due to missing data, which can increase consumer frustration.

Alternatively, and in some cases additionally, the telephone number from which the consumer is calling is identified by the consumer services representative and compared with any telephone numbers that the consumer services representative has on record which are known by the consumer services representative to be associated with the consumer. This requires the consumer services representative to have access to a consumer profile or record, for each of their consumers, which must contain the consumer telephone number. Unfortunately, this does not obviate the need for security questions as only the telephone number is validated. There is limited value, in terms of security, in validating the telephone number alone as the identity of the consumer making the telephone call is not directly validated.

Short Message Service (SMS) validation is a further known method for validating the identity of the consumer. Conventional SMS validation requires the consumer services representative to issue a validation code to a mobile device known to belong to a particular consumer via SMS. The consumer is required to return the code to the consumer services representative via some conventional means, such as through an online portal or spoken during a telephone call with the consumer services representative, so as to prove that the consumer is in possession of the mobile device to which the SMS has been sent. This requires the consumer services representative to have a consumer profile for each consumer which must contain the consumer telephone number. Additionally, means for generating and sending a code to the consumer via SMS, such as a SMS gateway in communication with a server, are also required.

The SMS validation process also does not eliminate the need for security questions as the consumer services representative would first need to know enough information about the consumer so as to be able to obtain the correct consumer record in order to be able to obtain the telephone number to which the SMS code should be sent. Additionally, only the consumer's possession of the mobile device is directly validated. There is only limited value, in terms of security, in validating the consumer's possession of the mobile device alone as the identity of the consumer making the telephone call is not directly validated.

The above methods of validating the identity of the consumer are all limited in that they are inefficient and provide only limited security. Accordingly, there is a need for an improved method and system for validating the identity of a consumer during a telephone call to a consumer services representative.

BRIEF DESCRIPTION

An aspect of the disclosure provides a method, at a mobile device, of authenticating a user of the mobile device during a telephone call, the method including the steps of: obtaining a user authentication input, obtaining validation of the user authentication input, initiating a telephone call with, or receiving a telephone call from, a third party computer system, and if the user authentication input is successfully validated, sending a token generated for the telephone call with the third party computer system via data-over-voice signaling during the telephone call thereby providing an indication that the user authentication input has been successfully validated to the third party computer system.

The data-over-voice signaling of the token only occurs if the user authentication input has been successfully validated. If the token is successfully validated, then the third party computer system can determine that the identity of the user has also been validated. Thus, making use of the above method, a third party computer system is able to authenticate the identity of a user of a mobile device efficiently and securely during a telephone call between the third party computer system and the mobile device.

The token can be sent while a telephone call is being conducted and the data-over-voice signaling can be automatically programmed so that the user of the mobile device is not required to take any additional actions, such as receiving a code via SMS and returning the code back on to the third party computer system. Thus, the use of data-over-voice signaling to send the token is more efficient than the mechanisms used in conventional methods of user identification.

The method may further include the step of sending a token request to a security server and receiving the token from the security server. The security server may be remote from the mobile device. As such, the overall security of the system can be increased as it is much easier to maintain the security of a server than it is a mobile device, which can potentially be handled by anyone.

The token request may be encrypted before being sent to the security server. This can add a further layer of security. The token request may be encrypted as a one-way function, such as a hash function, and, optionally, an arbitrary number used only once, such as a nonce, may be added to the token request before the one-way function is generated, for additional security.

The token request may further include data relating to the user authentication input for validating at the security server. The user authentication input may then be validated at a server, which has associated security benefits.

The method further may include the step of receiving the token from the security server only if the user authentication input is successfully validated by the security server. This adds a further layer of security as the token may only be generated once the user authentication input is successfully validated. As such, the token may only be sent to the third party computer system when the user authentication input validation has been successful.

The step of obtaining validation of the user authentication input may include validating the user authentication input at the mobile device. Here, validation of the user authentication input may be carried out locally at the mobile device. Advantageously, this means that validation of the user authentication input may still be carried out offline, where the mobile device cannot contact the security server.

The method may further include the step of generating the token at the mobile device using information stored in a secure memory of the mobile device, if the validation of the user authentication input at the mobile device is successful. In this embodiment, the generation of the token is carried out locally at the mobile device. Advantageously, this means that generation of the token may still be carried out offline, i.e. where the mobile device is not able to contact the security server.

The token is generated using a cryptographic key or key pair, or an algorithm common to the mobile device and the third party computer system. This can add a further layer of security. The mobile device and the third party computer system may be provided with corresponding cryptographic keys, so as to enable secure generation of the token the mobile device and validation of the token at the third party computer system, even when the third party computer system is not able to contact the security server.

The method may further include the step of generating a cryptographic key or key pair at the mobile device, or the step of receiving a cryptographic key or key pair. The cryptographic key or key pair may be generated remotely at a secure location, or they may be generated at the mobile device. In either instance, the cryptographic key or key pair may be stored in a secure memory of the mobile device, for example, on secure element.

The cryptographic key or key pair is only generated/received if the user authentication input is successfully validated. This may add a further layer of security as the token may only be generated once the user authentication input is successfully validated. As such, the token may only be sent to the third party computer system when the user authentication input validation has been successful.

The method may further include the step of identifying a communication failure with a security server, wherein the step of sending a token includes sending data relating to a past interaction, or past interactions, between the security server and the mobile device to the third party computer system via data-over-voice signaling during the call. The data relating to a past interaction, or past interactions may be encrypted using a one-way hash function and, optionally, a nonce added before the hash function is generated. This would reduce the amount of data to be sent via data-over-voice signaling.

The step of sending a token may include sending a token via dual-tone multi-frequency, DTMF, signaling during the telephone call.

The third party computer system, if given access to the details of the past interactions between the security server and the mobile device, may be able to match this against the data received from the mobile device in order to validate the mobile device. Advantageously, this information may be used by the third party computer system to validate the mobile device where the mobile device is unable to access the security server. As this information may also act as a token, it may also be used to validate the identity of the user as the token is only generated once the user authentication input has been validated.

The token may be encrypted before being sent to the third party computer system, adding a further layer of security.

The user authentication input may be one or more of a biometric input, fingerprint, face photo, eye photo, pattern, or PIN.

The token may be uniquely generated for the telephone call. Uniquely generating the token for a particular call has added security benefits, such as a reduced vulnerability to replay attacks.

The method may further include the steps, at the third party computer system, of: after the mobile device has obtained successful validation of the user authentication input, receiving a token generated for the telephone call with the mobile device via data-over-voice signaling during the telephone call, and obtaining validation of the token, thereby validating the identity of the user of the mobile device. By obtaining validation of the token, the third party computer system can determine that the identity of the user has also been validated, for the reasons outlined above.

The method may further include the step of, at the third party computer system, retrieving a user record corresponding to the user of the mobile device, if the token is successfully validated. Advantageously, the computer system not only can determine that the identity of the user of the mobile device has been validated, it may also obtain information associated with the user of the mobile device, which can provide context to the call.

The method may further include the step of, at the third party computer system, identifying a communication failure with a security server, wherein the step of obtaining validation of the token includes validating the token at the third party computer system using a cryptographic key or an algorithm common to the third party computer system and the mobile device when a communication failure with the security server is identified. In this way, the computer system may still obtain validation of the token when there is a communication failure with a security server.

The method may further include the step of, at the third party computer system, receiving data relating to a past interaction, or past interactions, between the security server and the mobile device via data-over-voice signaling during the call and comparing this with a record obtained by the computer system or stored at the computer system, thereby validating the identity of the mobile device. Advantageously, the received data relating to a past interaction, or past interactions, between the security server and the mobile device can be used to validate the identity of the mobile device as it can be mapped to a particular record associated with a particular mobile device.

The step of receiving data relating to a past interaction, or past interactions, may include receiving data relating to a past interaction, or past interactions via dual-tone multi-frequency, DTMF, signaling during the telephone call.

The step of receiving a token may include receiving a token via dual-tone multi-frequency, DTMF, signaling during the telephone call.

An aspect of the disclosure provides a method, at a computer system, of authenticating a user of a mobile device, which has obtained validation of a user authentication input, during a telephone call with the mobile device, the method including the steps of: initiating a telephone call with or receiving a telephone call from the mobile device, after the mobile device has obtained successful validation of the user authentication input, receiving a token generated for the telephone call with the mobile device via data-over-voice signaling during the telephone call, obtaining validation of the token, thereby validating the identity of the user of the mobile device. The identity of the user of the mobile device is validated once the token is validated as the token is only received after successful validation of the user authentication input has been obtained by the mobile device.

The method may further include the step of retrieving a user record corresponding to the user of the mobile device, if the token is successfully validated. This provides the computer system with the means of gaining access to details of the user of the mobile device, as described above.

The method may further include the step of identifying a communication failure with a security server, wherein the step of obtaining validation of the token includes validating the token at the third party computer system using a cryptographic key or an algorithm common to the third party computer system and the mobile device when a communication failure with the security server is identified. In this way, the computer system may still obtain validation of the token when there is a communication failure with a security server.

The method may further include the step of receiving data relating to a past interaction, or past interactions, between the security server and the mobile device via data-over-voice signaling during the call and comparing this with a record obtained by the computer system or stored at the computer system, thereby validating the identity of the mobile device.

Advantageously, the received data relating to a past interaction, or past interactions, between the security server and the mobile device can be used to validate the identity of the mobile device as it can be mapped to a particular record associated with a particular mobile device.

The step of receiving data relating to a past interaction, or past interactions, may include receiving data relating to a past interaction, or past interactions via dual-tone multi-frequency, DTMF, signaling during the telephone call.

The step of receiving a token may include receiving a token via dual-tone multi-frequency, DTMF, signaling during the telephone call.

An aspect of the disclosure provides a mobile device including a processor, a memory, a user authentication input receiving module configured to obtain a user authentication input and obtain validation of the user authentication input, a telecommunication module configured to initiate a telephone call with or receive a telephone call from a third party computer system, and a data-over-voice signaling module configured to send a token generated for the telephone call with the third party computer system via data-over-voice signaling during the telephone call, if the user authentication input is successfully validated, thereby providing an indication that the user authentication input has been successfully validated to the third party computer system.

The mobile device may further include a security server communication module configured to send a token request to a security server and receive the token from the security server. This has the above outlined security benefits.

The data-over-voice signaling module may include a DTMF signaling module configured to send a token generated for the telephone call with the third party computer system via dual-tone multi-frequency, DTMF, signaling during the telephone call.

An aspect of the disclosure provides a telecommunication system including the mobile device as defined above, and a third party computer system further including a third party computer system telecommunication module for initiating a telephone call with or receiving a telephone call from the mobile device, a third party computer system data-over-voice signal receiving module for receiving the token from the mobile device, and a third party computer system token validation module for obtaining validation of the token, thereby validating the identity of the user of the mobile device.

The third party computer system may further include a third party computer system security server communication module for sending a token request to a security server and receiving the token from the security server.

The third party computer system data-over-voice signal receiving module is a DTMF signal receiving module.

BRIEF DESCRIPTION OF THE DRAWINGS

Embodiments will now be described, by way of example only, with reference to the accompanying drawings, in which.

DETAILED DESCRIPTION

Figure 1:
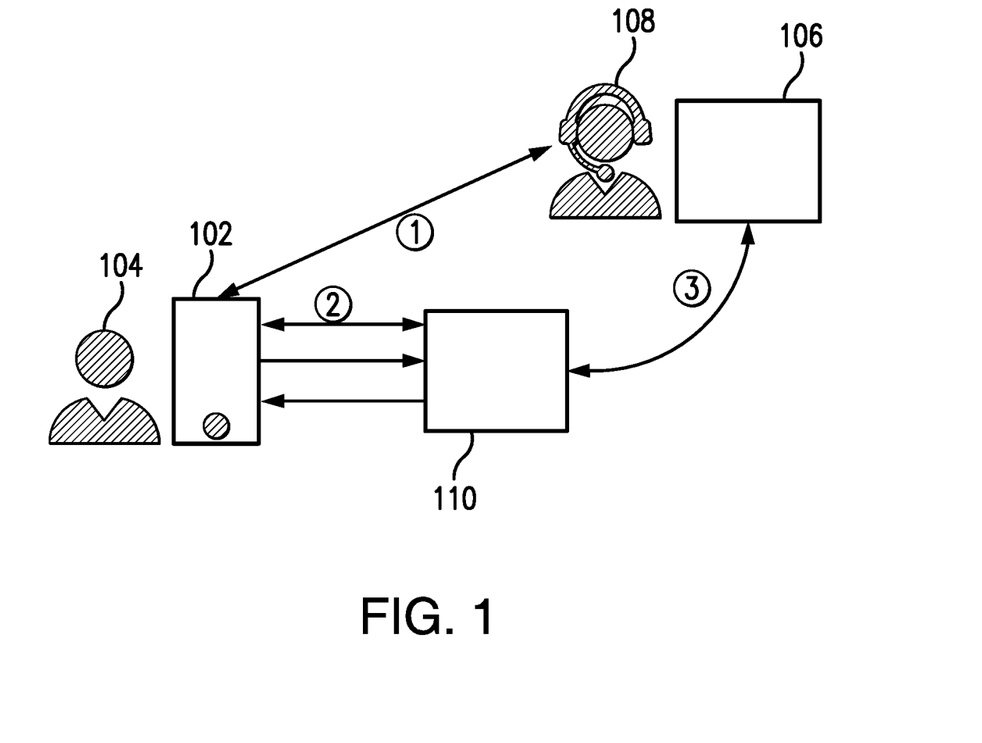
FIG. 1 depicts a representation of the components in a system.

FIG. 1 depicts a representation of the components in, and users of, a system suitable for carrying out the method described herein. The system includes a mobile device 102 suitable for making telephone calls, a user 104 of the mobile device 102, a third party computer system 106 having a telecommunication module for telephonically communicating with the mobile device 102, a third party user 108 who uses the third party computer system 106, and a security server 110.

There are three connections between the components of the system depicted in FIG. 1. A first connection 1 between the mobile device 102 and the computer system 106 is a telephone connection. The first connection 1 could also be via any network suitable for transmitting data via DTMF signaling. A second connection 2 is between the mobile device 102 and the security server 110. The second connection 2 may be via a telecommunications network, such as the internet. Finally, a third connection 3 is between the computer system 106 and the security server 110. The third connection 3 may also be via a telecommunications network, such as the internet.

The security server includes a relational database in which user details are stored. The user details include an identification number associated with the user known as a user ID. The user details further include a record of one or more user authentication inputs associated with the user 104 and any other information about the user 104 in the form of a user record. The user ID may also be stored on the mobile device 102, alongside the record of one or more user authentication inputs associated with the user 104.

Figure 9:
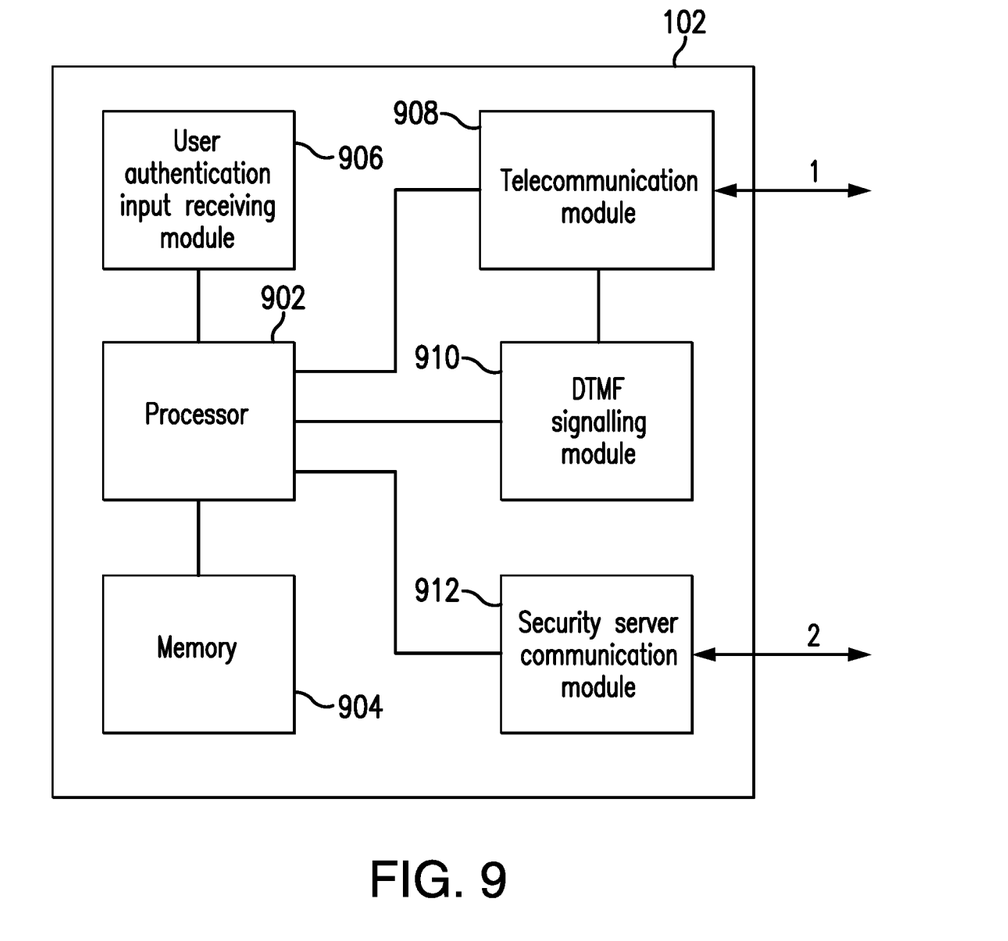
FIG. 9 depicts components of the mobile device shown in FIGS. 1, 3, 5, and 7.

FIG. 9 depicts components of the mobile device 102 shown in FIG. 1.

The mobile device 102 includes a processor 902 which is in communication with a memory 904, a user authentication input receiving module 906, a telecommunication module 908, a DTMF signaling module 910, and a security server communication module 912, all of which are in communication with the processor. The mobile device also includes a graphical user interface (GUI) (not shown) in communication with the processor.

The processor 902 controls the operation of the mobile device by issuing commands to the various components of the mobile device to perform operations.

The memory 904 is a secure memory for securely storing data, such as the record of user authentication inputs associated with the user 104 and a cryptographic key.

The user authentication input receiving module 906 is configured to allow the user 104 to input user authentication data such as a biometric input, fingerprint, pattern, face photo (i.e. for face recognition purposes), eye photo (i.e. for eye recognition purposes), or PIN at the mobile device 102. The user authentication input receiving module 906 may be integrated with the GUI.

The telecommunication module 908 is suitable for establishing the first connection 1 shown in FIG. 1, either by making a telephone call from the mobile device 102 or receiving a telephone call from the computer system 106.

The DTMF signaling module 910 is in communication with the telecommunication module 908 and is configured to automatically generate DTMF signals which are sent to the computer system 106 via the telecommunication module 908 and via the first connection 1.

Although the detailed embodiment described herein makes use of DTMF signals generated by a DTMF signaling module 910, the methods and processes of the detailed embodiment described herein could equally be carried out by using different signals.

In an alternative embodiment, a data-over-voice signaling module is provided, in place of the DTMF signaling module 910, which is in communication with the telecommunication module 908 and is configured to automatically generate data-over-voice signals which are sent to the computer system 106 via the telecommunication module 908 and via the first connection 1.

The data-over-voice signaling module may make use of a known mechanism for transmitting data during a telephone call. For example, the audio-frequency tones used by fax machines may be utilized or the audio frequency signals used by dial-up modems. Other known types of multi-frequency signaling may also be utilized, of which DTMF signaling is but one example.

It will be understood that the steps of all of the methods and processes described herein which are carried out by the DTMF signaling module 910 may, in the alternative embodiment, be carried out by the data-over-voice signaling module with data-over-voice signals being used in place of DTMF signals.

The security server communication module 912 is configured to establish the second connection 2 between the security server 110 and the mobile device. The security server communication module 912 is also configured to detect when a connection with the security server 110 is not available.

Figure 2:
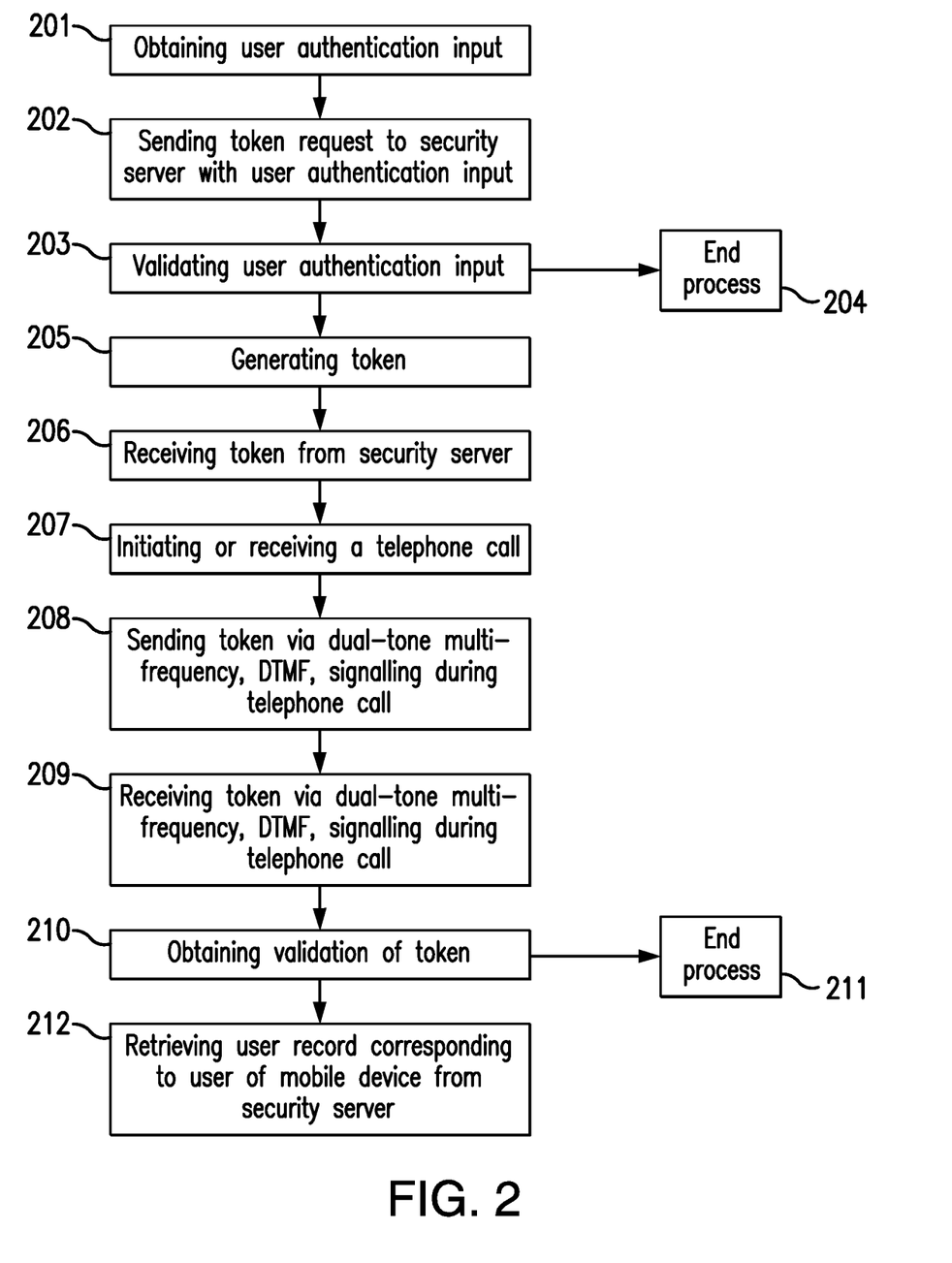
FIG. 2 is a flow diagram depicting the method steps carried out at the system of FIG. 1.

FIG. 2 is a process flow diagram. At step 201, the user authentication input receiving module 906 of the mobile device 102 obtains a user authentication input. The authentication input may be one or more of a biometric input, face photo, eye photo, fingerprint, pattern, PIN, or personal ID number.

At step 202, the security server communication module 912 of the mobile device 102 sends a token request to the security server 110 via the second connection 2. The token request includes an encrypted version of the user authentication input obtained at step 201. The token request is encrypted using a one-way hash function and, optionally, a nonce added to the token request before the hash function is generated.

At step 203, the security server 110 then receives the token request with the encrypted user authentication input. The security server 110 decrypts the user authentication input. The security server 110 validates the user authentication input by comparing it to a record of user authentication inputs associated with the user 104, provided in the user account, which are stored on the security server 110.

At step 204, if the validation of the user authentication input at the security server 110 is unsuccessful, the process is terminated.

At step 205, if the validation of the user authentication input at the security server 110 at step 203 is successful, a token is generated at the security server 110, which is then sent to the mobile device 102. The token is generated using a cryptographic key or key pair, or an algorithm common to the security server 110 and the computer system 106, such that the token can be validated at the computer system 106.

Alternatively, the token may be generated using a cryptographic key or an algorithm stored only on the security server 110 such that the token may only be validated at the security server 110.

At step 206, the security server communication module 912 of the mobile device 102 receives the token generated by the security server 110 via the second connection 2.

At step 207, the telecommunication module 908 of the mobile device 102 either initiates a telephone call with, or receives a telephone call from, the telecommunication module of the computer system 106 via the first connection 1.

At step 208, the DTMF signaling module 910 of the mobile device 102 generates a DTMF signal corresponding to the token and the token is sent by the telecommunication module 908 to the computer system 106 via DTMF signaling, during the telephone call, along with the user ID. This provides an indication that the user authentication input has been successfully validated to the computer system 106. This is because the DTMF signaling of the token only occurs if the user authentication input has been successfully validated. As such, the computer system 106 can determine that the user has been validated upon receiving a token and once validation of the token has been obtained by the computer system 106.

At step 209, the telecommunication module of the computer system 106 receives the token generated at the security server 110 along with the user ID from the mobile device 102 as a DTMF signal during the telephone call and a DTMF signal receiving module of the computer system 106 extracts the token from the received DTMF signal.

In the aforementioned alternative embodiment, the DTMF signal receiving module is replaced by a data-over-voice signal receiving module adapted to extract a token from a received data-over-voice signal.

At step 210, a token validation module of the computer system 106 obtains validation of the token. The token is validated at the computer system 106 using a cryptographic key or key pair, or an algorithm common to the mobile device 102 and the computer system 106.

Alternatively, where the token is generated using a cryptographic key or an algorithm stored only on the security server 110, the token validation module of the computer system 106 obtains validation of the token by contacting the security server 110 using a security server communication module of the computer system 106 which contacts the security server 110 via the third connection 3. The computer system 106 either sends the token to the security server 110 for validation and receives notification of the outcome from the security server 110, or it receives data from the security server 110 so as to enable validation to be performed at the computer system 106.

Once validation of the token has been obtained by the computer system 106, the computer system 106 can determine that the user authentication input has been successfully validated. Therefore, the computer system 106 can determine that the identity of the user 104 has been successfully validated. This can be indicated to the third party user 108 via any suitable means.

At Step 211, if the validation of the token is unsuccessful, the process is terminated and the computer system 106 either ends the call or attempts to authenticate the identity of a user 104 via other means.

At step 212, if the validation of the token is successful, the security server communication module of the computer system 106 uses the user ID to retrieve the user record corresponding to the user 104 of the mobile device 102 from the security server 110, via the third connection 3. The user record provides additional information about the user 104 to provide context to the call. For example, it can provide the computer system 106 with an indication of what the purpose of the call may be.

Figure 3:
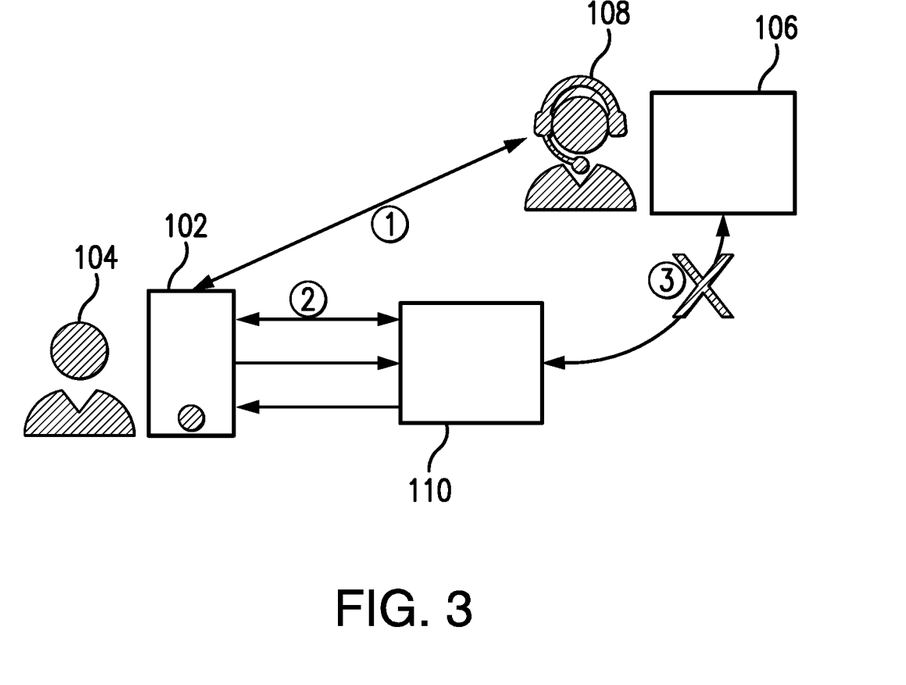
FIG. 3 shows an alternative system.

FIG. 3 shows an alternative system in which the third connection 3 is not available, i.e. the computer system 106 is not connected to the security server 110 and is working offline. When such an issue arises, the method may be automatically adapted, as shown in FIG. 4 and as shall now be described.

Figure 4:
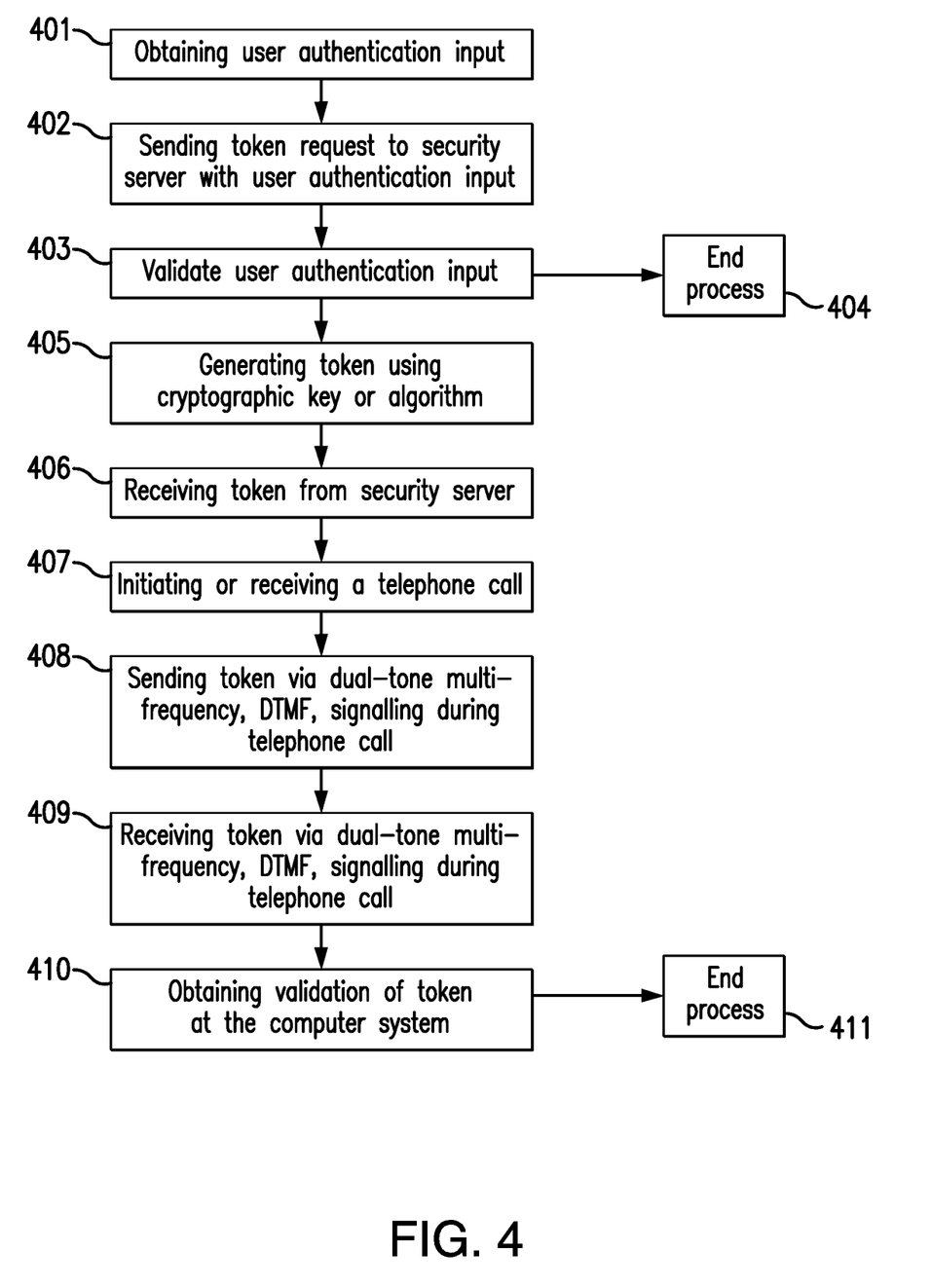
FIG. 4 is a flow diagram depicting the method steps carried out at the system of FIG. 3.

FIG. 4 is a process flow diagram. The processes carried out at steps 401 to 404 mirror the processes carried out at corresponding steps 201 to 204, as described above, as the first and second connections 1 and 2 are still available.

At step 405, the token is generated at the security server 110 using a cryptographic key, cryptographic key pair or algorithm which has already been shared with the computer system 106, such that the computer system 106 is able to validate the token itself without needing to access the security server 110 as the third connection 3 is unavailable.

The processes carried out at steps 406 to 409 mirror the processes carried out at corresponding steps 206 to 209.

At step 410, the security server communication module of the computer system 106 detects that no connection with the security server 110 is available and the token validation module of the computer system 106 validates the token at the computer system 106. The token is validated using a cryptographic key, cryptographic key pair or algorithm which has already been shared with the computer system 106. As such, the computer system 106 is able to validate the token itself without needing to access the security server 110. If the validation is successful, the third party user 108 may continue with the call knowing that the identity of the user 104 has been validated.

The process carried out at step 411 mirrors the process carried out at corresponding step 211.

Figure 5:
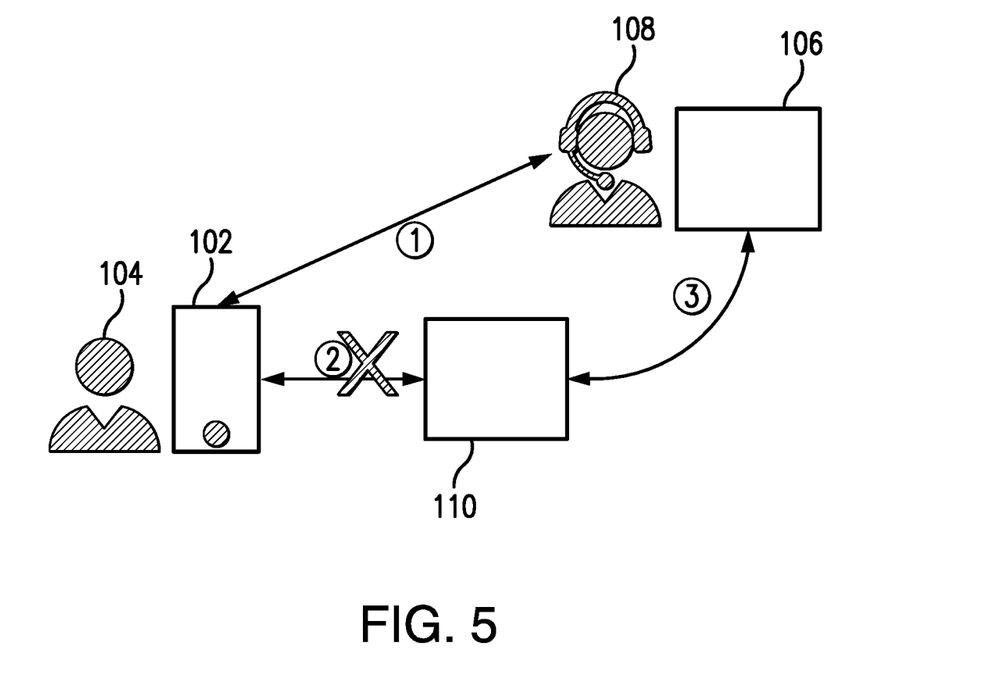
FIG. 5 shows an alternative system.

FIG. 5 shows an alternative system in which the second connection 2 is not available, i.e. the mobile device 102 is not in communication with the security server 110 and is working offline. When such an issue arises, the method may be automatically adapted, as shown in FIG. 6 and as shall now be described.

Figure 6:
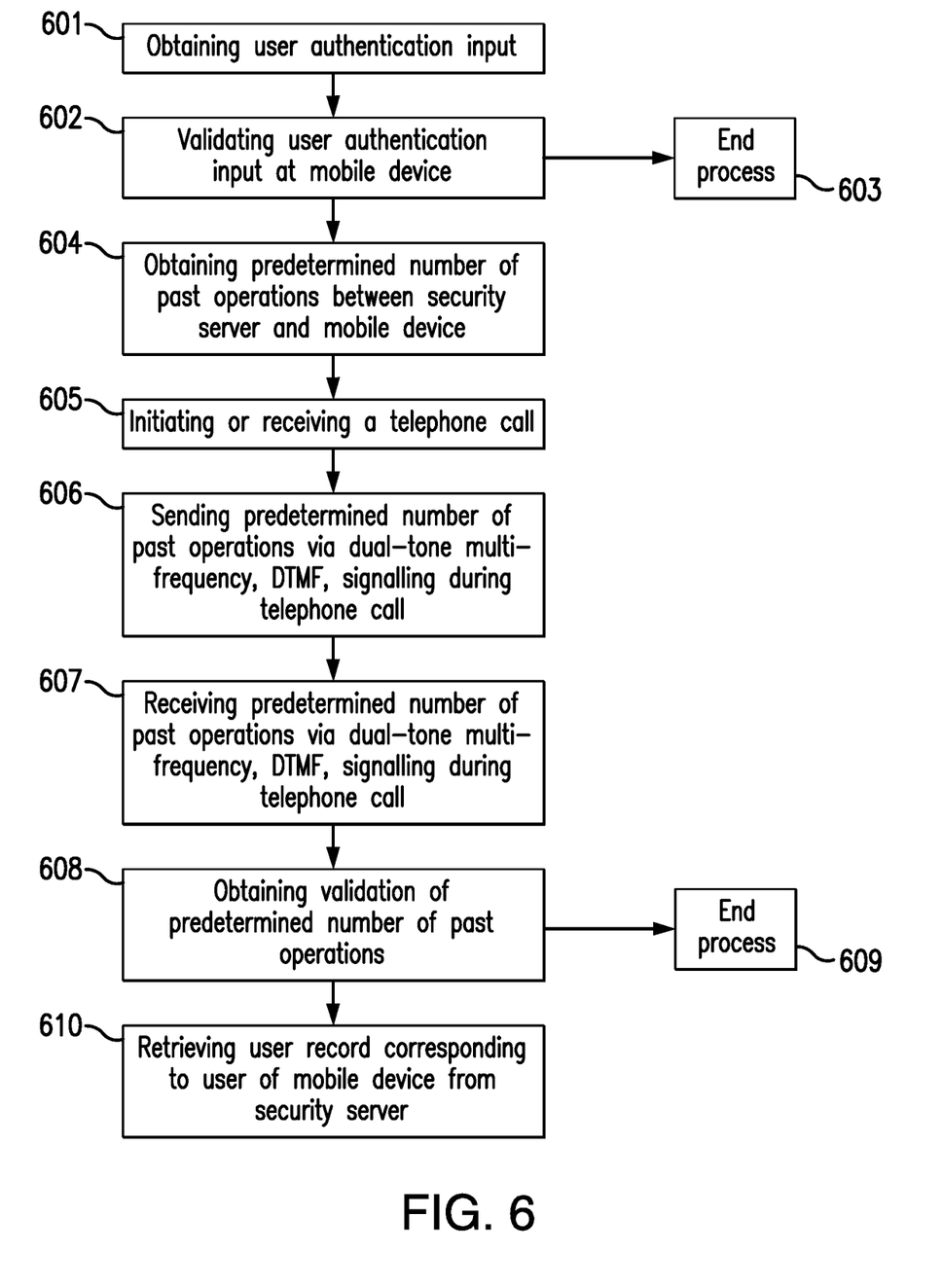
FIG. 6 is a flow diagram depicting the method steps carried out at the system of FIG. 5.

FIG. 6 is a process flow diagram. At step 601, the user authentication input is obtained by the mobile device 102 in the same manner as is in step 201, detailed above.

At step 602, the security server communication module 912 of the mobile device 102 detects that no connection with the security server 110 is available and the user authentication input is validated at the mobile device 102. The mobile device 102 validates the user authentication input by comparing it to a record of user authentication inputs associated with the user 104 which are securely stored on the mobile device memory 904. The memory 904 is a secure memory, for example it may be a secure element.

At step 603, if the validation of the user authentication input at the mobile device 102 is unsuccessful, the process is terminated.

At step 604, if the validation of the user authentication input at the mobile device 102 is successful, the mobile device 102 generates data relating to a past interaction, or past interactions, between the security server 110 and the mobile device 102. The mobile device 102 does this by obtaining a record of a predetermined number of past operations between the security server 110 and the mobile device 102. The record of a predetermined number of past operations acts as a token generated for a telephone call, which is then encrypted. The token is encrypted using a one-way hash function and, optionally, a nonce before being sent to the computer system 106.

At step 605, the telecommunication module 908 of the mobile device 102 either initiates a telephone call with, or receives a telephone call from, the telecommunication module of the computer system 106 via the first connection 1.

At step 606, the DTMF signaling module 910 of the mobile device 102 generates a DTMF signal of the encrypted data relating to a past interaction, or past interactions, between the security server 110 and the mobile device 102, which is sent as an encrypted token by the telecommunication module 908 to the computer system 106 via DTMF signaling, during the telephone call, along with the user ID. The token provides an indication that the user authentication input has been successfully validated to the computer system 106. This is because the DTMF signaling of the record of a predetermined number of past operations (i.e., the token) only occurs if the user authentication input has been successfully validated. As such, the computer system 106 knows that the user 104 has been validated upon receiving a token and once validation of the token has been obtained by the computer system 106.

In an alternative embodiment, steps 602 and 603 are omitted and no validation of the user authentication input occurs at the mobile device. Step 604 occurs automatically as there is no longer a validation of the user authentication input step at the mobile device 102. Instead, the user authentication input data is also encrypted and sent to the computer system 106 via DTMF signaling, during the telephone, for validation at the computer system 106.

At step 607, the telecommunication module of the computer system 106 receives the record of a predetermined number of past operations between the security server 110 and the mobile device 102 as an encrypted token, along with the user ID, from the mobile device 102 via DTMF signaling during the telephone call. The DTMF signal receiving module of the computer system 106 extracts the encrypted token from the received DTMF signal and the computer system 106 decrypts the token.

At step 608, the token validation module of the computer system 106 obtains validation of the token. The predetermined number of past operations is validated by contacting the security server 110 via the third connection 3. The security server communication module of the computer system 106 either sends the token to the security server 110 for validation and received confirmation of the outcome of the validation from the security server 110, or it receives a corresponding record of a predetermined number of past operations between the security server 110 and the mobile device 102 from the security server 110 so as to enable validation to be performed at the computer system 106.

Once validation of the token has been obtained by the computer system 106, the computer system 106 can determine that the user authentication input has been successfully validated. Therefore, the computer system 106 can determine that the identity of the user 104 has been successfully validated.

At Step 609, if the validation of the token is unsuccessful, the process is terminated and the computer system 106 either ends the call or attempts to authenticate the identity of a user 104 via other means.

At step 610, if the validation of the token is successful, the security server communication module of the computer system 106 uses the user ID to retrieve the user record corresponding to the user 104 of the mobile device 102 from the security server 110, via the third connection 3, thereby obtaining additional information about the user 104, as described above in relation to step 212.

In the alternative embodiment where the user authentication input data is also sent to the computer system 106, an additional process step, not shown in FIG. 6, may be carried out where the computer system 106 obtains validation of the received user authentication input data, either validating it locally or by sending it to the security server 110 for validation.

Figure 7:
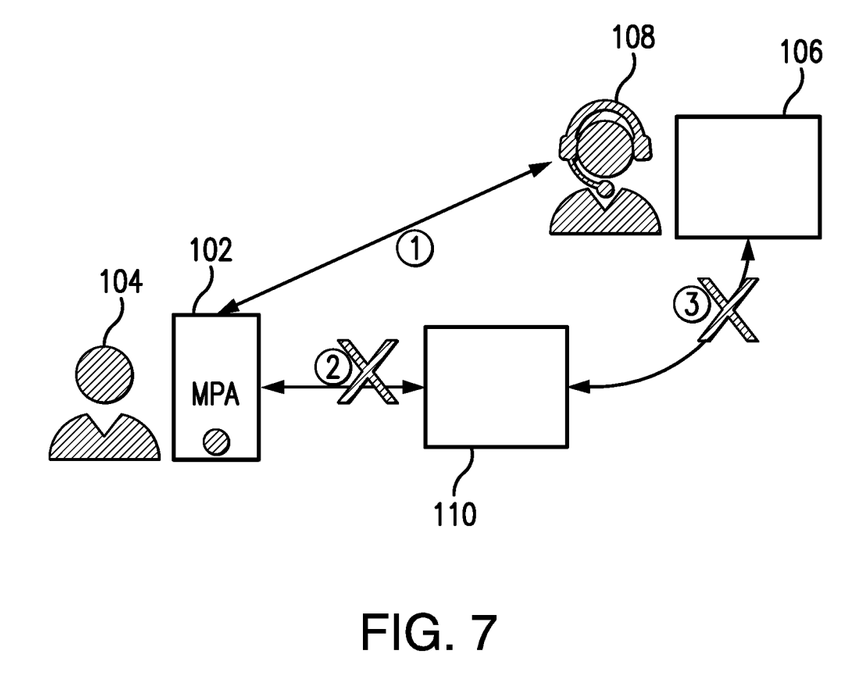
FIG. 7 shows an alternative system.

FIG. 7 shows an alternative system in which both the second and third connections 2 and 3 are not available, i.e. the mobile device 102 and the computer system 106 are working offline. When such an issue arises, the method may be automatically adapted, as shown in FIG. 8 and as shall be described below.

Figure 8:
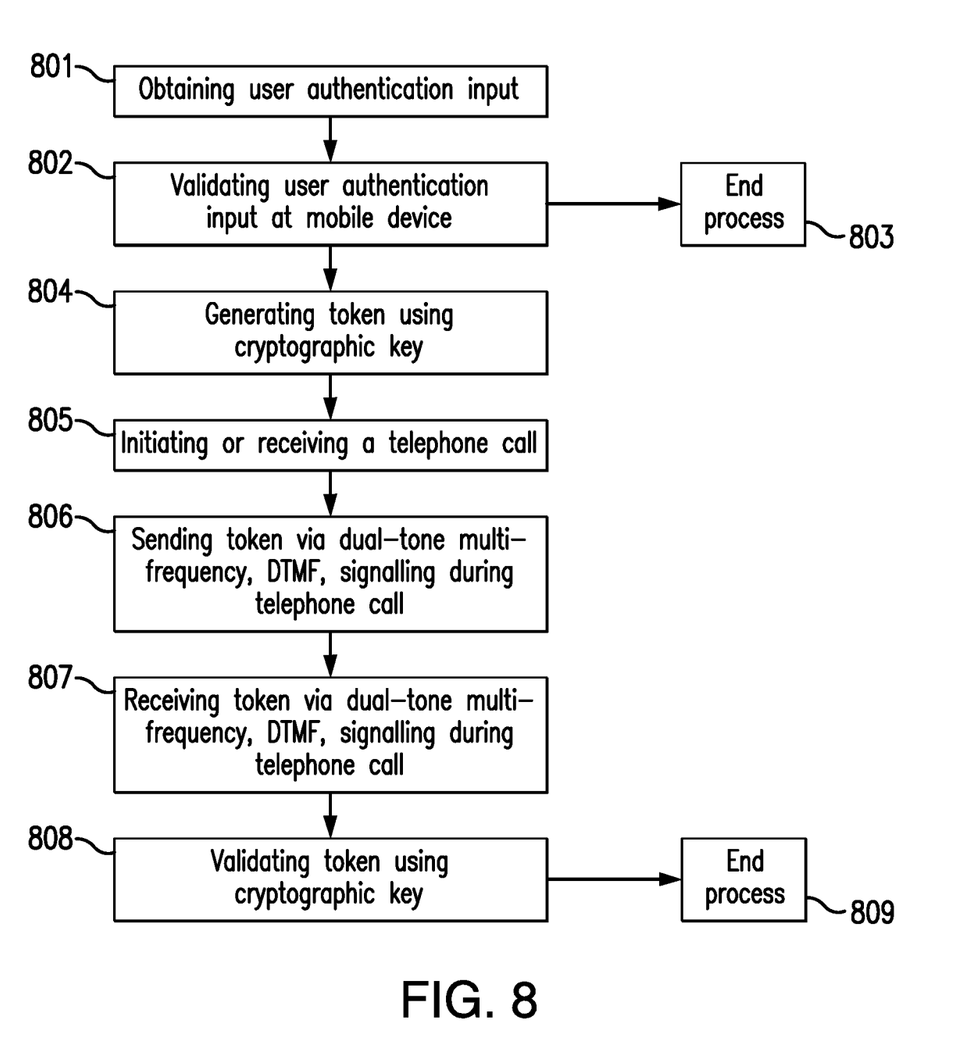
FIG. 8 is a flow diagram depicting the method steps carried out at the system of FIG. 7.

In the method shown in FIG. 8, a cryptographic key, such as a private key and public key pair or a symmetric key, are stored at the mobile device 102 and computer system 106. One of the following three ways is used to generate and distribute the private key and public key pair or symmetric key.

The security server 110 generates a key or key pair that is then propagated to the computer system 106 and mobile device 102 using any kind of channel. For example, the key or key pair may be propagated at a time when the second and third connections 2 and 3 are available or they may be transmitted by suitable alternative means.

Alternatively, the mobile device 102 generates the key or key pair that is then propagated to the computer system 106 using any kind of suitable channel, for example, using the first connection 1.

Alternatively, the computer system 106 generates the key or key pair that is then propagated to the mobile device 102 using any kind of suitable channel, for example, using the first connection 1.

FIG. 8 is a process flow diagram. At step 801, user authentication input is obtained by the user authentication input receiving module 906 of the mobile device 102 in the same manner as in step 201, detailed above.

At step 802, the user authentication input is validated by the user authentication input receiving module 906 of the mobile device 102 as no connection with the security server 110 is available. The user authentication input receiving module 906 of the mobile device 102 validates the user authentication input by comparing it to the record of user authentication inputs associated with the user 104 which are securely stored on the memory 904 of the mobile device 102.

At step 803, if the validation of the user authentication input at the mobile device 102 is unsuccessful, the process is terminated.

At step 804, if the validation of the user authentication input at the mobile device 102 is successful, the mobile device 102 generates an encrypted token using the cryptographic key stored at the mobile device 102.

At step 805, the mobile device 102 either initiates a telephone call with, or receives a telephone call from, the computer system 106 via the first connection 1.

At step 806, the mobile device 102 sends the encrypted token to the computer system 106 via DTMF signaling in the same manner as in step 208. This provides an indication that the user authentication input has been successfully validated to the computer system 106, for the same reasons as already described above in relation to step 208.

At step 807, the computer system 106 receives the token generated by the mobile device 102 via the telecommunication module of the computer system 106, along with the user ID, from the mobile device 102 via DTMF signaling during the telephone call, in the same manner as in step 209.

At step 808, the token validation module of the computer system 106 obtains validation of the token using the cryptographic key stored at the computer system 106 to decrypt the token. Once validation of the token has been obtained by the computer system 106, the computer system 106 can determine that the identity of the user 104 has been successfully validated for the reasons outlined above. As such, the third party user 108 may continue with the call knowing that the identity of the user 104 has been validated.

At step 809, if the validation of the token is unsuccessful, the process is terminated and the computer system 106 either ends the call or attempts to authenticate the identity of a user 104 via other means.

Any of the herein described communications between the various modules of the system described herein may be encrypted and decrypted using conventional encryption methods, as would be understood by the skilled person in the art.

The process flow charts and descriptions thereof herein should not be understood to prescribe a fixed order of performing the method steps described therein. Rather, the method steps may be performed in any order that is practicable.

Generally, any of the functionality described in this text or illustrated in the figures can be implemented using software, firmware (e.g., fixed logic circuitry), programmable or non-programmable hardware, or a combination of these implementations.

Methods and processes described herein can be embodied as code (e.g., software code) and/or data. Such code and data can be stored on one or more computer-readable media, which may include any device or medium that can store code and/or data for use by a computer system.

What is claimed is:

1. A method implemented at a mobile device for authenticating a user of the mobile device during a telephone call, the mobile device in communication with a security server and a third party computer system, the method comprising:

obtaining, at the mobile device, a user authentication input from the user of the mobile device, the user authentication input including at least one of a biometric input, fingerprint, face photo, eye photo, pattern, and PIN;

validating the user authentication input;

upon successful validation of the user authentication input, generating interaction data associated with one or more past interactions between the mobile device and the security server by obtaining, from the security server, a record of a predetermined number of past operations between the mobile device and the security server, the record being obtained as a token;

in response to generating the interaction data associated with the one or more past interactions, encrypting, using an encryption scheme common to the mobile device and the third party computer system, the token by encrypting the user authentication input and the record of the predetermined number of past operations;

initiating a telephone call with the third party computer system via a telecommunications channel;

generating a dual-tone multi-frequency (DTMF) signal including the encrypted token; and during the telephone call, sending the DTMF signal via the telecommunications channel to the third party computer system, thereby enabling the third party computer system to validate the encrypted token by communicating with the security server and applying the encryption scheme, such that the identity of the user of the mobile device is validated.

2. The method according to claim 1, wherein obtaining validation of the user authentication input comprises validating the user authentication input at the mobile device.

3. The method according to claim 2, further comprising generating the token at the mobile device using information stored in a secure memory of the mobile device, if the validation of the user authentication input at the mobile device is successful.

4. The method according to claim 1, further comprising generating at least one of a cryptographic key, and a cryptographic key pair at the mobile device, or receiving at least one of the cryptographic key and the cryptographic key pair.

5. The method according to claim 1, further comprising identifying a communication failure with the security server.

6. The method according to claim 1, wherein the token is encrypted before being sent to the third party computer system.

7. The method according to claim 1, wherein the token is uniquely generated for the telephone call.

8. The method according to claim 1, further comprising, at the third party computer system, retrieving a user record corresponding to the user of the mobile device, if the token is successfully validated.

9. The method according to claim 1, further comprising, at the third party computer system, identifying a communication failure with a security server, wherein obtaining validation of the token comprises validating the token at the third party computer system using at least one of a cryptographic key and an algorithm common to the third party computer system and the mobile device, when a communication failure with the security server is identified.

10. The method according to claim 1, further comprising, at the third party computer system, receiving data relating to at least one past interaction between the security server and the mobile device via data-over-voice signaling during the telephone call and comparing the received data to a record obtained by the third party computer system or stored at the third party computer system, thereby validating the identity of the mobile device.

11. The method according to claim 1, further comprising, at the mobile device:

upon successful validation of the user authentication input, generating, using a one-way hash function, a token request by encrypting the user authentication input;

establishing a connection with the security server;

in response to establishing the connection with the security server, transmitting the token request to the security server for validation at the security server; and in response to the validation of the encrypted user authentication input included in the token request, receiving a token from the security server, the token generated using at least one of a cryptographic key, cryptographic key pair, and an algorithm common to the security server and the third party computer system.

* * * * *